(12) United States Patent
Potlapally et al.

(10) Patent No.: US 9,930,051 B1
(45) Date of Patent: Mar. 27, 2018

(54) REMOTE MANAGEMENT OF HARDWARE HOSTS IN CLOUD INFRASTRUCTURE

(71) Applicant: Amazon Technologies, Inc., Seattle, WA (US)

(72) Inventors: Nachiketh Rao Potlapally, Arlington, VA (US); Jason Alexander Harland, Seattle, WA (US); Derek Del Miller, Austin, TX (US); Christopher James BeSerra, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 14/935,314

(22) Filed: Nov. 6, 2015

(51) Int. Cl.
*H04L 29/06* (2006.01)
*G06F 13/42* (2006.01)
*H04L 9/32* (2006.01)

(52) U.S. Cl.
CPC ........ *H04L 63/126* (2013.01); *G06F 13/4282* (2013.01); *H04L 9/3242* (2013.01); *H04L 2209/24* (2013.01)

(58) Field of Classification Search
CPC .......................... G06F 13/4282; H04L 9/3242
See application file for complete search history.

(56) References Cited

U.S. PATENT DOCUMENTS

| | | | | |
|---|---|---|---|---|
| 6,892,383 B1* | 5/2005 | Arndt | ................... | G06F 9/5077 711/203 |
| 8,560,823 B1* | 10/2013 | Aytek | ..................... | G06F 8/665 713/191 |
| 9,009,357 B2* | 4/2015 | Asnaashari | ........... | G06F 3/0605 710/8 |
| 9,626,513 B1* | 4/2017 | Aytek | ..................... | G06F 21/572 |
| 2003/0140291 A1* | 7/2003 | Brown | ............. | G01R 31/31855 714/724 |
| 2008/0244553 A1* | 10/2008 | Cromer | ................. | G06F 21/572 717/168 |
| 2012/0179932 A1* | 7/2012 | Armstrong | .............. | G06F 11/20 714/4.11 |
| 2012/0311332 A1* | 12/2012 | Johnsen | ................ | H04L 9/3234 713/168 |
| 2013/0318595 A1* | 11/2013 | Wang | .................. | G06F 9/45558 726/16 |
| 2014/0109076 A1* | 4/2014 | Boone | ....................... | G06F 8/65 717/170 |

(Continued)

*Primary Examiner* — Mohammad A Siddiqi
(74) *Attorney, Agent, or Firm* — Kilpatrick Townsend & Stockton LLP

(57) ABSTRACT

In a cloud environment, each host computer can have its own security service processor with an independent network interface for communicating with a remote server over a network. The security service processor can provide remote management and security functionalities for various devices connected using different buses on a platform in each host computer. The security service processor can provide a centralized mechanism to verify and authenticate firmware updates for various devices using different buses. A hardware interface can allow the security service processor to provide remote debugging and diagnostic capabilities. The security service processor can also provide some of the typical functionalities of a baseboard management controller or can be used in addition to the baseboard management controller.

19 Claims, 8 Drawing Sheets

(56) References Cited

U.S. PATENT DOCUMENTS

| | | | |
|---|---|---|---|
| 2015/0127983 A1* | 5/2015 | Trobough | G06F 11/267 |
| | | | 714/30 |
| 2015/0220737 A1* | 8/2015 | Rothman | G06F 21/572 |
| | | | 726/1 |
| 2016/0283221 A1* | 9/2016 | Kochar | G06F 9/45558 |
| 2016/0299865 A1* | 10/2016 | Hetzler | G06F 13/4282 |
| 2017/0024303 A1* | 1/2017 | Christopher | G06F 17/30194 |

* cited by examiner

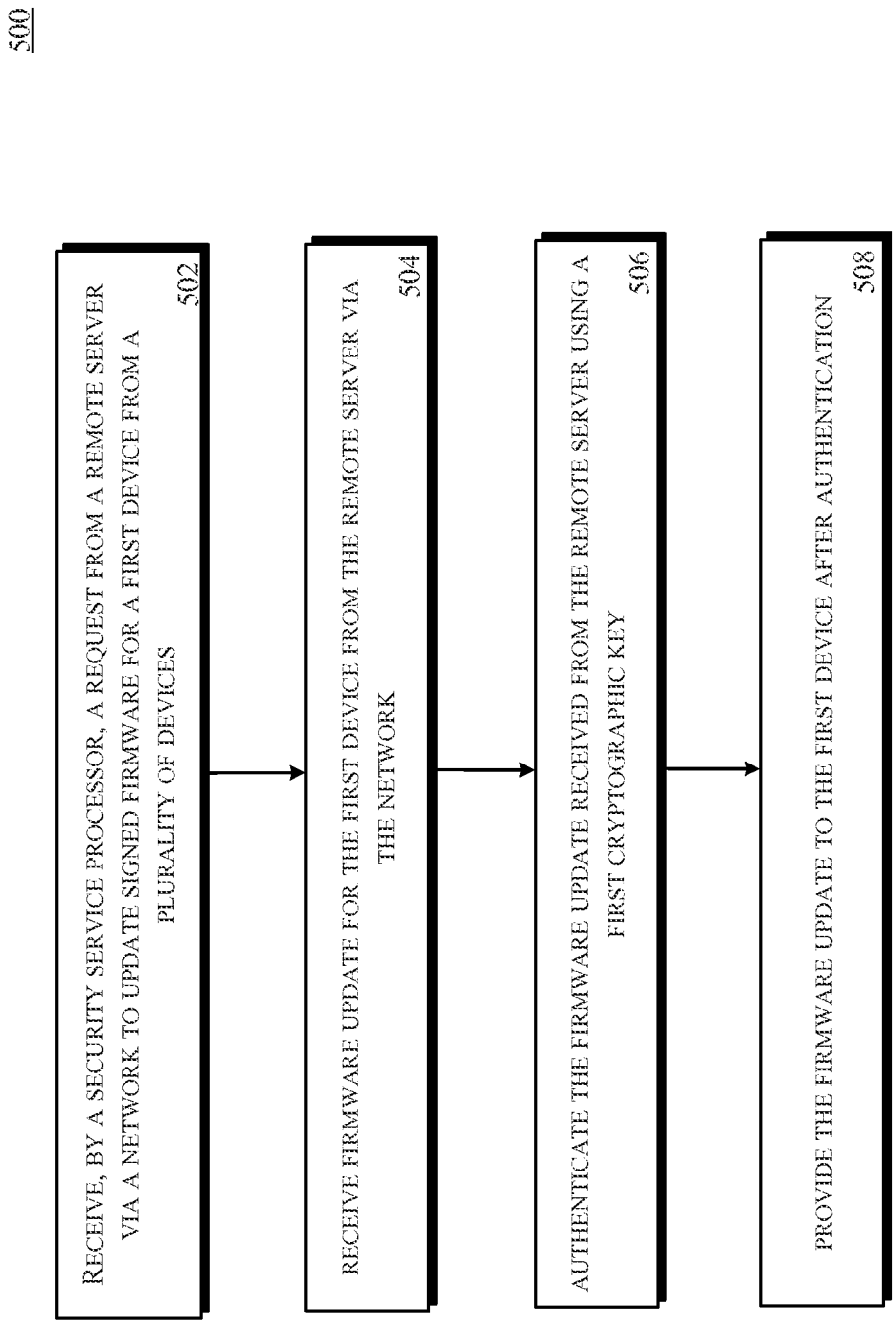

REMOTE MANAGEMENT OF HARDWARE HOSTS IN CLOUD INFRASTRUCTURE

BACKGROUND

In a cloud environment, a server computer often communicates with multiple host computers over a network. In some instances, the server computer can perform remote management of a host computer via the network using a host processor. However, typical solutions provide a piecemeal approach for remote management. For example, firmware for different devices in the host computer can be generally updated on a device by device basis using the host processor. However, these firmware updates may not be managed securely, thus making the host computer vulnerable to malicious attacks and causing potential data loss for the customers. In some instances, firmware for a device can be accessed using untrustworthy firmware over a serial bus, e.g., by placing a hardware component on the serial bus with non-signed firmware. The piecemeal approach for updating firmware can allow insertion of malicious code or non-signed firmware which can make the host computer prone to malware attacks or human errors.

BRIEF DESCRIPTION OF THE DRAWINGS

Various embodiments in accordance with the present disclosure will be described with reference to the drawings, in which:

FIG. 5A illustrates a method for performing firmware updates for a device using a security service processor, in one embodiment of the disclosed technology.

DETAILED DESCRIPTION

Figure 1:
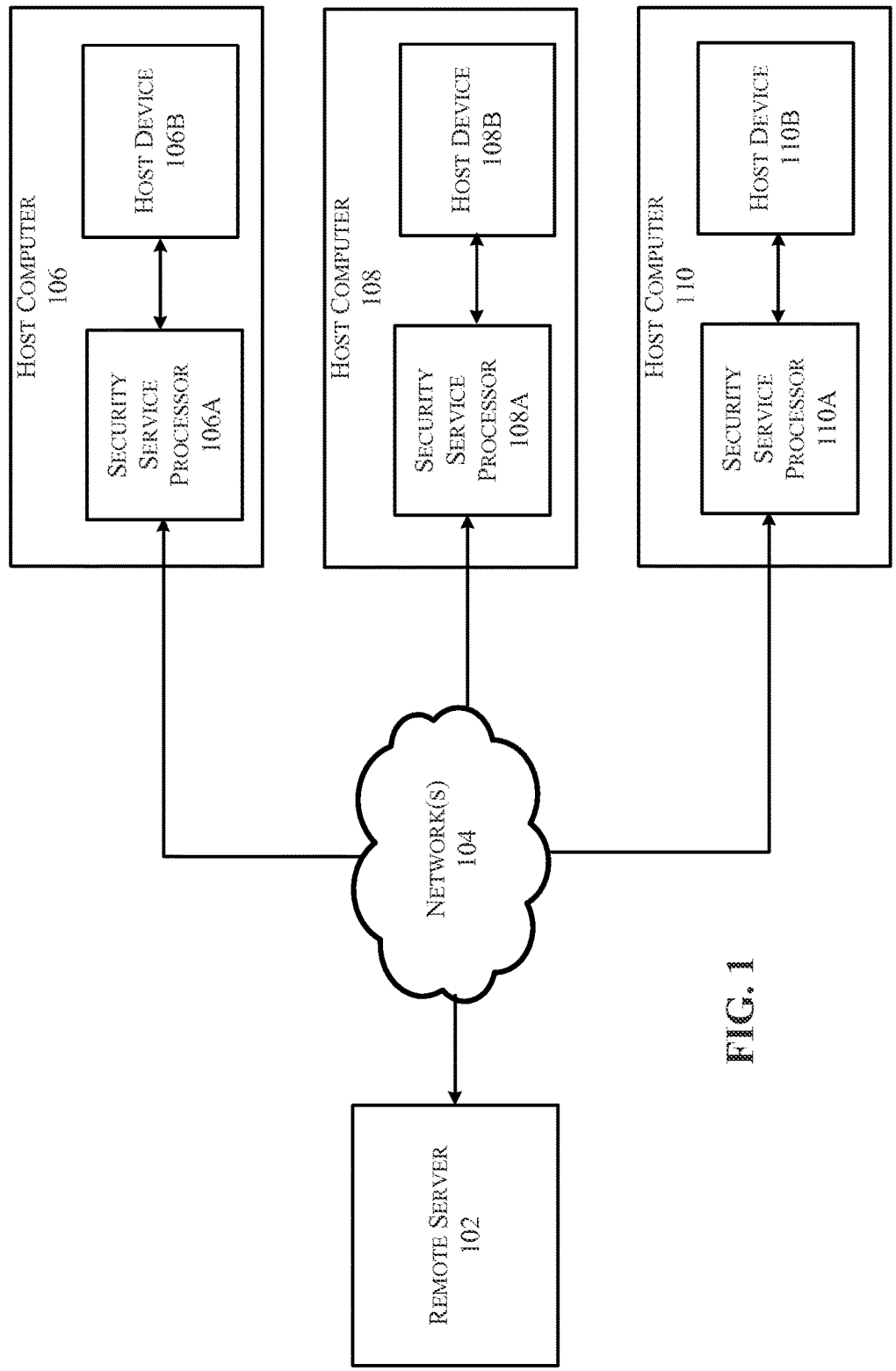
FIG. 1 illustrates a system comprising a remote server in communication with a plurality of host computers over a network, according to one embodiment of the disclosed technology.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a cloud environment, a server computer can communicate with multiple host computers over a network. For example, the server computer can provide services such as cloud computing, cloud storage, analytics, web services, databases, applications, etc. to different clients. Each host computer may include some hardware components, e.g., a motherboard, memory, audio and video cards, peripherals, disc drives, etc. Some components may include firmware to perform different functionalities. Firmware is a software program and configuration data that is typically stored in a non-volatile memory (e.g., ROMs, EEPROMs, flash), also called firmware store or firmware volume. In some implementations, the host computer may include a host processor, memory, various peripheral devices, storage devices and other components coupled via various buses on a motherboard. For example, an SMBus (System Management Bus), I$^2$C (Inter-Integrated Circuit) bus, SPI (Serial Peripheral Interface) bus, LPC (Low Pin Count) bus, etc. can be used for communication with various on board devices, e.g., flash, EEPROMs, Ethernet devices, power management devices, etc. In some instances, PCI (Peripheral Components Interconnect)/PCI express (PCIe) bus can be used to communicate with PCI/PCIe devices, e.g., network devices, sound cards, video cards, disc controllers, USB devices, etc.

The firmware on different devices in the host computer may need to be updated for various reasons, e.g., to incorporate bug fixes or to include additional features as new versions are released. Typically, the firmware for a device is updated using the host processor on a device-by-device basis. For example, in most instances, the firmware for a device can be updated by communicating with the host processor over a serial bus (e.g., the I$^2$C bus) using a non-signed firmware. However, these firmware updates may not be managed securely, thus making the host computer vulnerable to security attacks. Some solutions can allow management and monitoring of some components of the host computer independently of the host processor. However, most of the existing solutions provide piecemeal approach for management. For example, in some instances, BIOS (Basic Input/Output System) can be accessed by the remote server over the network, e.g., using Intelligent Platform Management Interface (IPMI). However, the existing solutions do not provide a centralized mechanism to securely access firmware stores for all the devices connected via various buses on a platform, e.g., a motherboard. Further, the current solutions do not provide a centralized mechanism for verification of firmware updates for different devices on the platform, thus making the host computer prone to malware attacks and human errors. For example, in the piecemeal approach, firmware updates through I$^2$C or a CPLD (Complex Programmable Logic Device) can allow the insertion of malicious code or non-signed firmware in the absence of a centralized mechanism to measure and authenticate the firmware before performing the updates.

In various embodiments of the disclosed technologies, a security service processor can provide a centralized mechanism to perform introspection, verification, or authentication of firmware for different devices in a host computer. For example, the different devices (e.g., peripheral devices, storage devices, flash memory, etc.) can be connected using various buses on a platform, e.g., a motherboard, in the host computer. In embodiments of the disclosed technologies, the firmware for a device may include firmware that may have been signed using a cryptographic key. In some embodiments, the security service processor can be a discrete component on the platform with a dedicated network interface (e.g., an Internet Protocol (IP) address or a Media Access Control (MAC) address). The security service processor can communicate with a remote server over a network using the network interface and can provide remote management and security functionalities for different devices independent of a host processor. The security service processor may be capable of communicating with the different devices on the platform using corresponding buses, e.g., I²C, SPI, SMBus, PCI, PCIe, LPC, etc., independent of the host processor. According to different embodiments, the security service processor can verify trustworthiness of firmware code, update the firmware code independent of the host access, and can allow firmware to be updated without host reboot using different buses to update different devices.

In some embodiments, the security service processor and the remote server may establish trust in each other using a public key infrastructure. The security service processor may receive a request from the remote server using a secure channel (e.g., based on Transport Layer Security (TLS) or Secure Sockets Layer (SSL)) to update firmware for a device accessible via a bus on the platform. For example, the device may be an EEPROM accessible via a serial bus, e.g., an I²C bus. In some embodiments, introspection of a device can include monitoring and analyzing current state of the device. For example, the security service processor may be configured to perform introspection of the device to provide a status of the device, e.g., outputs from various sensors for power, temperature, etc. In some embodiments, the security service processor can perform verification of a device to determine trustworthiness of the firmware code for the device. In various embodiments of the disclosed technologies, each device may be configured to execute a signed firmware. For example, the firmware may be signed by an external entity, e.g., a certificate authority, a vendor or a distributor of the software. The signed firmware may have been loaded at the time of production, at board assembly or may have been re-flashed at a later time. In one embodiment, the security service processor may first read the existing firmware for a device, calculate a cryptographic hash of the firmware and compare to a reference value to verify the firmware. If the firmware for the device is trustworthy, the security service processor may request the remote server for a firmware update for the device. The security service processor may authenticate the updated firmware received from the remote server using a cryptographic key before performing the firmware update for the device. In some embodiments, the security service processor may also be configured to execute signed firmware which can reside in a boot memory or in a firmware store on the platform and can be authenticated and securely updated by the security service processor. In some embodiments, the security service processor may perform additional security checks before performing the firmware update for a device. For example, the security service processor may verify a version number for the updated firmware received from the remote server to ensure that the firmware update does not include an older version. If the firmware code for the device has been tampered with for any reason, the security service processor may not perform the firmware updates and communicate the results of the authentication to the remote server. In some embodiments, a hypervisor running on the host processor may also include signed firmware code which can be authenticated and securely updated by the security service processor.

In some embodiments, the security service processor can also provide debug capabilities in addition to the verification and authentication of firmware stores. For example, some embodiments can provide a hardware interface for JTAG (Joint Test Action Group) to allow invasive debug, non-invasive debug, diagnostics, etc. of the security service processor, e.g., using a serial port, USB port, I/O pins, etc.

Various embodiments of the disclosed technologies can provide the ability to verify and update firmware securely for different devices on a platform using a security service processor. The security service processor can perform management and security functionalities independent of the host processor, e.g., even when the host processor is not operational. In some embodiments, the security service processor can perform hot patching to update the code for the hypervisor or any of the devices on the platform (e.g., for bug fixes) with software patches without needing to shut down or restart the host computer. In some embodiments, one or more devices (e.g., drives) which are on independent power planes on the platform can be reset or power-cycled independently by the security service processor without affecting the other devices or the host processor. Thus, according to different embodiments of the disclosed technologies, each host computer in a cloud environment can have its own security service processor with an independent network interface for communicating with a remote server over a network to provide a centralized mechanism for remote management and security functionalities for different devices in the respective host computer without compromising the security of the host computer.

In some embodiments, a security service processor can be used in addition to a baseboard management controller (BMC). Typically, the BMC may be used to monitor the physical state of the host computer, e.g., temperature, humidity, power-supply status, operating system status, etc. In some embodiments, the security service processor can perform some debugging and management functionalities that are typically performed by the BMC, e.g., reading sensor data or status of a device.

FIG. 1 illustrates a system 100 comprising a remote server in communication with a plurality of host computers over a network in a cloud environment. Each host computer can comprise a security service processor with a dedicated network interface, according to various embodiments of the disclosed technologies. The security service processor on various host computers can be interacted remotely by establishing a secure protocol with the remote server. In different embodiments, the security service processor on each host computer may have the ability to introspect and verify firmware stores for different devices connected via various buses in the host computer. The security service processor may be able to authenticate and update the firmware for different devices securely without any interaction with the host device. According to some embodiments, the firmware for different devices may be signed firmware which can be verified, authenticated and updated by the security service processor using a public key infrastructure. In some embodiments, the security service processor for each host computer may include a hardware interface to facilitate debugging using a port, I/O pin, etc., e.g., using JTAG.

As illustrated in FIG. 1, a system 100 may include a remote server 102 in communication with a host computer 106, a host computer 108 and a host computer 110 via one or more networks 104. The host computer 106 may include a security service processor 106A communicatively coupled to a host device 106B. The host computer 108 may include a security service processor 108A communicatively coupled to a host device 108B. The host computer 110 may include a security service processor 110A communicatively coupled to a host device 110B. The host computers 106, 108 and 110 may include additional components which are not shown in FIG. 1 for the purposes of simplicity. For example, each of the host computers 106, 108 and 110 may include various devices with firmware to perform different functionalities as discussed further with reference to FIG. 2 and FIG. 3.

In some instances, the remote server 102 may provide services to different clients such as cloud computing, cloud storage, data processing and warehousing, archive, analytics, web services, databases, applications, deployment services, website hosting, etc. In some implementations, the host computers 106, 108 and 110 may provide various services such as computer services, network services, etc. For example, the compute services may include providing virtual or physical resources to client computers, e.g., by launching virtual machine instances of various sizes, associating storage volumes to the virtual machines on demand, providing client computers with resources to run applications by renting virtual machines, data processing, storage, etc. The network services may include network related functionalities such as network traffic shaping, network acceleration, network storage processing, network switching, etc.

In some instances, the networks 104 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. In various embodiments of the disclosed technologies, each host computer 106, 108 and 110 may include one or more network interfaces to communicate with the remote server 102. For example, in some embodiments, each of the security service processors 106A, 108A and 110A may include an independent network interface to communicate with the remote server 102. For example, the security service processors 106A, 108A and 110A may communicate with the remote server 102 to receive requests from the remote server for verifying the firmware executed by different devices, updating the firmware for different devices on the respective host computer, to request the remote server for a cryptographic key to authenticate the firmware for different devices, to receive updated firmware from the remote server for different devices and for other suitable tasks. In some embodiments, each of the security service processors 106A, 108A, 110A and the remote server 102 may establish trust in each other by establishing a secure channel for communication based on a cryptographic protocol, e.g., TLS, etc. via the networks 104. In some implementations, one or more devices on the host computer 106 may include additional network interfaces to communicate with the remote server 102.

In some embodiments, the security service processors 106A, 108A and 110A may be configured to perform management and security functionalities independent of the host device 106B, 108B, 110B respectively. For example, each security service processor 106A, 108A and 110A may utilize its respective network interface to communicate with the remote server 102 via the networks 104. In some embodiments, each security service processor 106A, 108A and 110A can perform hot patching to update the firmware for any of the devices on the platform (e.g., for bug fixes or revision updates) or a hypervisor for the respective host processor without needing to shut down or restart the respective host computer. In some embodiments, each of the security service processors 106A, 108A and 110A may include a hardware interface to allow access for JTAG to perform invasive debug or non-invasive debug, diagnostics, etc. using one or more ports and/or pins in the host computer 106, 108 and 110 respectively.

Figure 2:
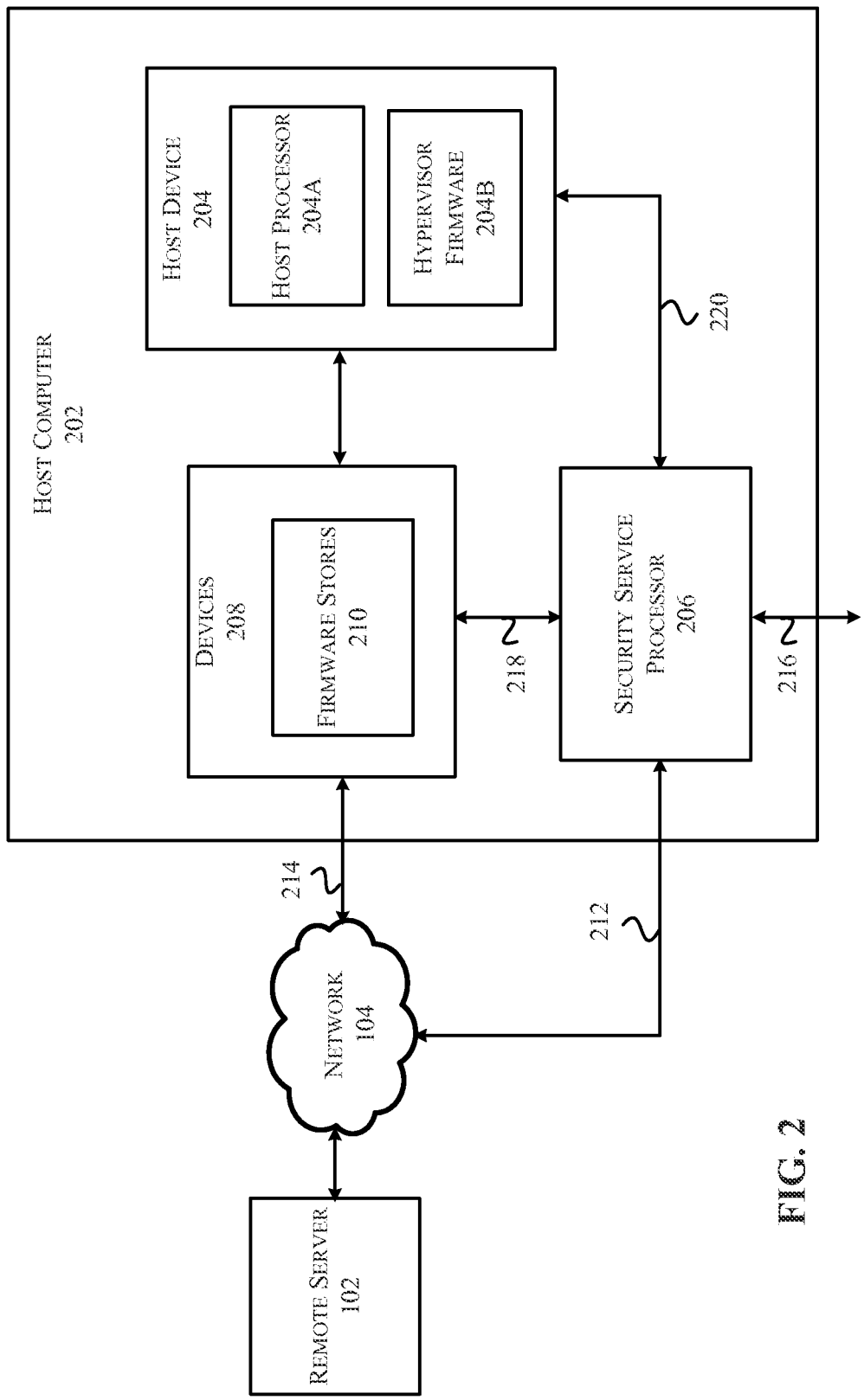
FIG. 2 illustrates a system comprising a high level block diagram of a host computer in one embodiment of the disclosed technology.

FIG. 2 illustrates a system 200 comprising a high level block diagram of a host computer 202. The host computer 202 may be similar to the host computer 106, 108 or 110 as discussed with reference to FIG. 1. For example the host computer 202 may also be configured to communicate with the remote server 102 via the network 104.

The host computer 202 may include a host device 204, a security service processor 206 and devices 208. The security service processor 206 may include a first network interface 212 to communicate with the remote server 102 via the network 104. The security service processor 206 may be communicatively coupled to the devices 208 via various buses, collectively shown as buses 218. For example, the buses 218 may include one or more of an I²C bus, SPI bus, SMBus, PCI bus, PCIe bus, LPC bus, etc.

In some embodiments, the devices 208 may include a plurality of devices that may be coupled to the security service processor 206 via respective buses. For example, the devices 208 may include low speed peripheral devices (e.g., EEPROMs, sensors, DACs, ADCs, power management chips, etc.), PCI/PCIe devices (e.g., network cards, audio cards, video cards, controllers, etc.), memory devices (e.g., flash memory, disc drives, hard drives, SATA drives, etc.) and other suitable devices. The devices 208 may include firmware stores 210 for some or all of the devices in the devices 208. For example, the firmware stores 210 may include firmware for different devices in the host computer 202. According to the embodiments of the disclosed technologies, at least some of the devices 208 may be configured to execute signed firmware. For example, in some embodiments, signed firmware may include firmware that has been encrypted with a cryptographic key using a public key infrastructure (PKI). Signed firmware for the devices can minimize the chances of code alteration or corruption after the firmware has been deployed. In one embodiment, the firmware may be signed by a trusted entity. For example, a trusted certificate authority (CA) can provide a signed certificate and a pair of keys, a public key and a private key for authentication of the firmware. In some embodiments, the cryptographic keys may be vendor specific or may be signed by another entity. The firmware for each device from the devices 208 may be resident on the corresponding device or may be in a standalone memory in the host computer 202.

In various embodiments, the security service processor 206 may have the ability to verify the firmware stores 210 and to authenticate and update firmware for different devices from the devices 208 including the security service processor 206. For example, the security service processor 206 may receive a request from the remote server 102 via the first network interface 212 to verify the firmware for a device. The security service processor 206 may have access to all the devices 208 on the platform using various buses 218. In some embodiments, the security service processor 206 may establish a trust with the device before performing verification, authentication and the firmware update. For example, the security service processor 206 may verify the existing signed firmware for the device by calculating a cryptographic hash of the signed firmware and comparing to a reference value. If the firmware of the device is verified, the security service processor 206 may authenticate the firmware update received from the remote server 102 using a cryptographic key. Once the firmware update is authenticated, the security service processor 206 may provide the updated firmware to the device for installation. In some embodiments, the security service processor 206 may be capable of hot patching the firmware for various devices without needing to reboot the platform. For example, the security service processor 206 may have access to the firmware code for different devices using various buses and can update the firmware in specific memory locations on the fly.

The security service processor 206 may include a debug interface 216 to provide a hardware interface for debugging. For example, the hardware interface may provide access for JTAG or another interface to perform invasive debug, non-invasive debug, diagnostics, etc. using one or more ports and/or pins. The debug interface 216 can allow the security service processor 206 to provide remote debugging via the first network interface 212.

The host device 204 may include a host processor 204A and a hypervisor firmware 204B. The host processor 204A may be configured to execute a plurality of instructions that may be stored in a computer readable storage medium. The computer-readable storage medium may be non-transitory. In some instances, the computer readable medium may be part of a host memory (not shown), e.g., RAM, ROM, Electrically Erasable Programmable Read-Only Memory (EEPROM), flash memory or any suitable storage media. In some instances, the host device 204 may include an x86 CPU platform, e.g., Xeon, Pentium, etc., an ARM platform, or a PowerPC platform, etc. for running an operating system (not shown). The hypervisor firmware 204B or a virtual machine manager (VMM) may be configured to manage one or more virtual machines on the host device 204, e.g., to create, start, monitor, stop or to delete the virtual machines.

In different embodiments, some or all of the hypervisor firmware 204B may be in the form of software code that may be verified, authenticated or updated by the security service processor 206. In one embodiment, the security service processor 206 may communicate with the host device using a host interface 220. For example, the host interface 220 may include a PCIe interface. In some embodiments, the security service processor 206 may have the ability to perform hot patching for updating the hypervisor firmware 204B without needing to shut down or restart the host computer 202. For example, the security service processor 206 may have the ability to access the hypervisor code and update the hypervisor code using DMA (direct memory access) to certain memory locations.

According to some embodiments of the disclosed technologies, the security service processor 206 may perform verification and authentication of device firmware without any interaction with the host processor 204A. In some embodiments, the security service processor 206 may be on a different power plane than the host device 204. This may allow the security service processor 206 to operate even when the host device 204 is powered off or is non-functional. For example, the security service processor 206 can communicate with the remote server 102 using the first network interface 212 to provide remote management, debugging and security functionalities.

Figure 3:
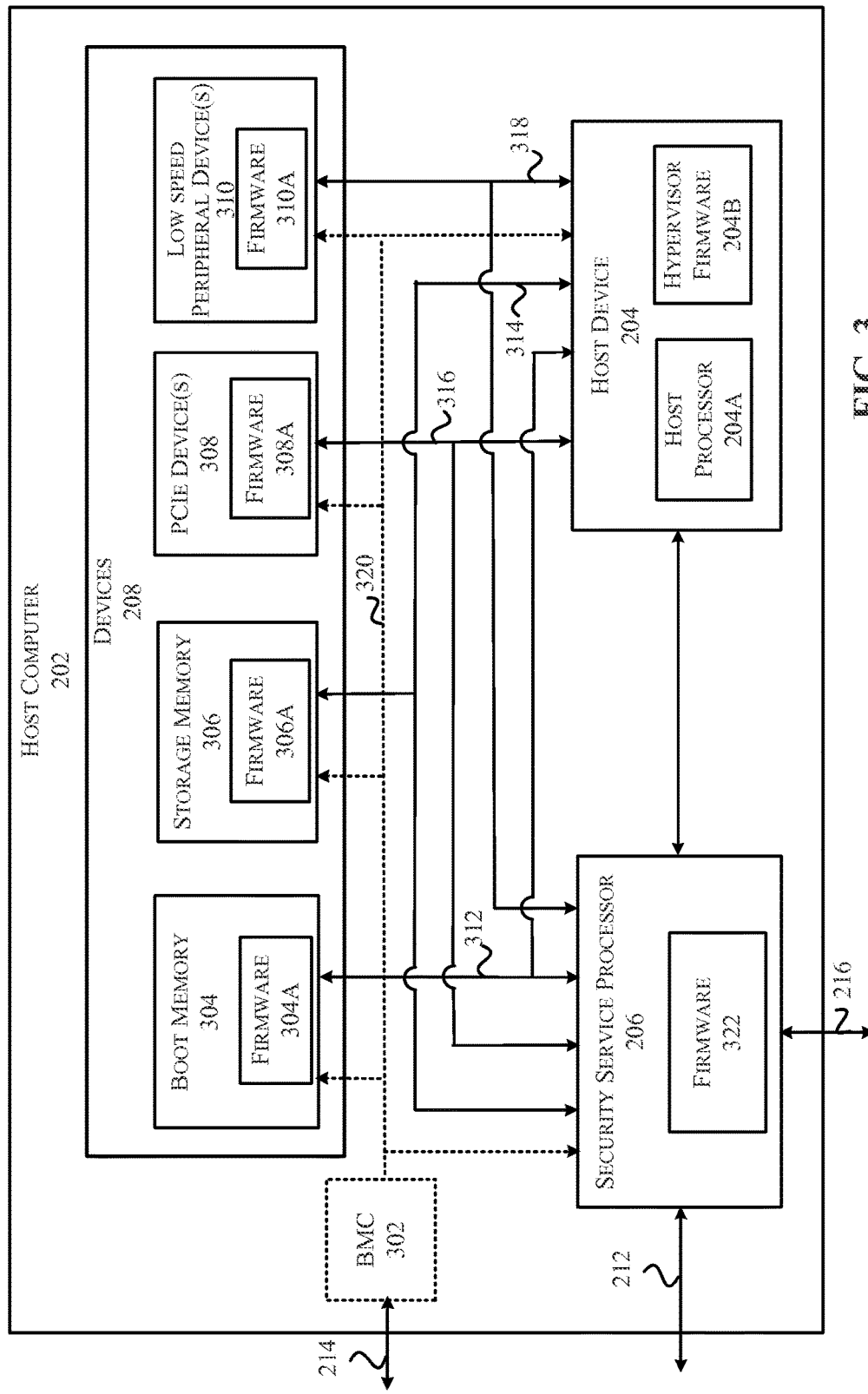
FIG. 3 illustrates a block diagram for a host computer comprising a security service processor connected to different devices via various buses in one embodiment of the disclosed technology.

FIG. 3 illustrates a block diagram for a host computer comprising a security service processor connected to different devices via various buses in one embodiment of the disclosed technology. In various embodiments of the disclosed technologies, the security service processor may be capable of accessing different devices using the various buses to perform remote management and security functionalities.

As illustrated in the figure, the host computer 202 may include the devices 208 comprising a boot memory 304, a storage memory 306, PCIe devices 308 and low speed devices 310. In one embodiment, some or all the components of the host computer 202, as shown in FIG. 3, may reside on a platform, e.g., a motherboard. It will be understood that the devices 208 may include less or more devices than shown in FIG. 3 without deviating from the scope of the disclosed technologies. In one embodiment, an optional baseboard management controller (BMC) 302 may be communicatively coupled to the security service processor 206, host device 204 and the devices 208. In some implementations, the BMC 302 may utilize the second network interface 214 to communicate with the remote server 102.

According to various embodiments, the security service processor 206 may be capable of accessing the boot memory 304, storage memory 306, PCIe devices 308 and low speed devices 310 via respective buses 312, 314, 316 and 318. In some embodiments, the security service processor 206 may utilize a bus controller to communicate with a device using the corresponding bus. In some embodiments, the security service processor 206 may steal cycles on various buses on which different devices with firmware are connected for introspection, verification, authentication and update of firmware for the individual device. In some embodiments, the host device 204 may communicate with the devices 208 via the respective buses using one or more controllers or bridges (not shown).

The boot memory 304 may include firmware 304A. For example, the boot memory 304 may include a flash memory, an EEPROM, a ROM or any suitable memory, which can connect to the host device 204 and the security service processor 206 using the bus 312, e.g., an LPC bus, an I$^2$C bus or an SPI bus. Accordingly, the security service processor 206 can utilize an LPC bus controller, an I$^2$C bus controller or an SPI bus controller to communicate with the boot memory 304. In some embodiments, the firmware 304A may include software for BIOS, UBoot firmware or boot software compatible with UEFI (Unified Extensible Firmware Interface) specification. For example, the boot memory 304 may include software to initialize and test various components of the host computer 202 and also to load an operating system and other programs from a memory. In one embodiment, the firmware 304A may include signed firmware. For example, the firmware 304A may have been signed using a cryptographic key. The signed firmware 304A may have been loaded on the boot memory 304 at production time, at the board assembly or at any other suitable time. The cryptographic key may include a vendor specific key or a public key (e.g., an RSA key provided by a certificate authority).

The storage memory 306 may include firmware 306A. For example, the storage memory 306 may include hard disks, SATA drives, SSDs (Solid State Drives), optical disc drives, etc. In some embodiments, the firmware 306A may include software for a memory controller. For example, in some implementations, a SATA controller can reside on a SATA drive. In some embodiments, the bus 314 used for communication with the storage memory 306 may be based on a PCI/PCIe interface. Accordingly, the security service processor 206 can utilize a PCI/PCIe bus controller to communicate with the storage memory 306. In one embodiment, the firmware 306A may include signed firmware. For example, the firmware 306A may have been signed using a cryptographic key. The signed firmware 306A may have been loaded on the storage memory 306 at production time, at the board assembly or at any other suitable time. The cryptographic key may include a vendor specific key or a public key (e.g., an RSA key provided by a certificate authority).

The PCIe device(s) 308 may include one or more peripheral devices based on the PCIe interface configured to communicate using a PCIe bus, e.g., the bus 316. For example, the PCIe device(s) 308 may include a network interface controller (NIC), a graphics card, a video card, a sound card, etc. Accordingly, the security service processor 206 can utilize a PCIe bus controller to communicate with the PCIe device(s) 308. The PCIe device(s) 308 may include firmware 308A. It will be understood that for more than one PCIe devices, there can be corresponding firmware that can be resident on the respective PCIe device or can be part of a firmware store including firmware for more than one device. In one embodiment, the firmware 308A may include signed firmware. For example, the firmware 308A may have been signed using a cryptographic key. The signed firmware 308A may have been loaded on the PCIe device 308 at production time, at the board assembly or at any other suitable time. The cryptographic key may include a vendor specific key or a public key (e.g., an RSA key provided by a certificate authority).

The low speed peripheral device(s) 310 may include one or more low speed peripheral devices comprising firmware 310A. In different embodiments, various low speed peripheral devices 310 may communicate using different buses, e.g., $I^2C$, SPI, LPC, SMBus or any other suitable bus. For example, the low speed peripheral devices 310 may include sensors, ADC, DAC, Ethernet controllers, RAID controllers, flash memory, EEPROMs, power management chips, etc. Accordingly, the security service processor 206 can utilize an $I^2C$ bus controller, SPI bus controller, LPC bus controller or SMBus bus controller to communicate with the low speed peripheral device(s) 310. It will be understood that for more than one low speed peripheral devices, there can be corresponding firmware that can be resident on the respective peripheral device or can be part of the firmware store. In one embodiment, the firmware 310A may include signed firmware. For example, the firmware 310A may have been signed using a cryptographic key. The signed firmware 310A may have been loaded on the low speed peripheral device 310 at the production time, at the board assembly or at any other suitable time. The cryptographic key may include a vendor specific key or a public key (e.g., an RSA key provided by a certificate authority).

In one embodiment, the security service processor 206 may be configured to execute firmware 322. The firmware 322 may include signed firmware that may be signed using a cryptographic key. In some embodiments, the firmware 322 may be part of the boot memory 304 (e.g., the firmware 304A) or the firmware stores 210. According to some embodiments, the security service processor 206 may perform verification, authentication and updates of the firmware 322 as requested by the remote server 102.

The security service processor 206 may be capable of establishing trust in a device, establishing trust in the firmware update for the device and performing the update on the device. The security service processor 206 may have access to all the necessary keys and certificates needed for verification and authentication of all the devices on the platform and the respective firmware updates. In one embodiment, the security service processor 206 may perform verification of the existing signed firmware for the device before performing any firmware updates. For example, the security service processor 206 may calculate a cryptographic hash of the signed firmware and compare to a reference value to verify that the signed firmware existing on the device is trustworthy. The reference value may reside on the security service processor 206 or can be retrieved from the remote server 102 via the network 104. In some embodiments, the security service processor 206 may utilize a PKI to perform the verification of the signed firmware. For example, a first cryptographic key may be baked or bonded into the security service processor 206 or the security service processor 206 may retrieve the first cryptographic key from the remote server 102 before verification.

After verifying the signed firmware for the device, the security service processor 206 may send a request to the remote server 102 via the first network interface 212 for a firmware update for the device. In some embodiments, the firmware update may be signed using a second cryptographic key. For example, the second cryptographic key may be an RSA key provided by a certificate authority or another entity or may be vendor specific key. According to the embodiments of the disclosed technologies, the security service processor 206 may authenticate the firmware update received from the remote server 102 using the second cryptographic key before performing the updates. For example, the second cryptographic key may be baked or bonded into the security service processor 206 or the security service processor 206 may retrieve the second cryptographic key from the remote server 102. In some embodiments, the first cryptographic key and the second cryptographic key can be the same. In some embodiments, the security service processor 206 may perform additional security checks before performing the firmware update. For example, the security service processor 206 may verify the version number of the firmware to ensure that the firmware update includes a later version number.

In one embodiment, the host computer 202 may include an optional BMC 302 in addition to the security service processor 206. In some implementations, the BMC 302 can monitor the physical state of the hardware of the host computer 202 and can communicate with the remote server 102 through an independent connection, e.g., the second network interface 214. For example, the BMC 302 can monitor different parameters such as temperature, cooling fan speeds, power status, operating system (OS) status, etc. using various sensors built into the host computer 202. The BMC 302 can also control power states as well as perform power cycling. In one embodiment, the BMC 302 can interface with different components of the host computer 202 using a bus 320, e.g., SMBus. The BMC 302 can accordingly send alerts or report ECC errors to a system administrator (e.g., the remote server 102) via the second network interface 214 if any of the parameters do not stay within preset limits, indicating a potential failure. In some embodiments, the remote server 102 can also communicate with the BMC 302 via the network 104 to take some corrective action, e.g., to reset or power cycle the system to get a hung OS running again. In some embodiments, the BMC 302 can communicate with another BMC or other satellite controllers in another chassis via a bridge.

In some embodiments, in the absence of the BMC 302, the security service processor 206 can provide at least some of the typical functionality of the BMC 302 in addition to providing security functionalities for verification, authentication and update of the firmware. In some embodiments, one or more devices may be on a separate power plane that the host processor 204A which can allow the security service processor 206 to manage the devices independent of the host processor 204A. For example, in some embodiments, the security service processor 206 may be capable to reset or power cycle the system based on the commands received from the remote server 102. In addition, the security service processor 206 may be capable of monitoring the status of different sensors for various hardware components in the host computer 202 and providing the status to the remote server 102 using the first network interface 212.

Figure 4:
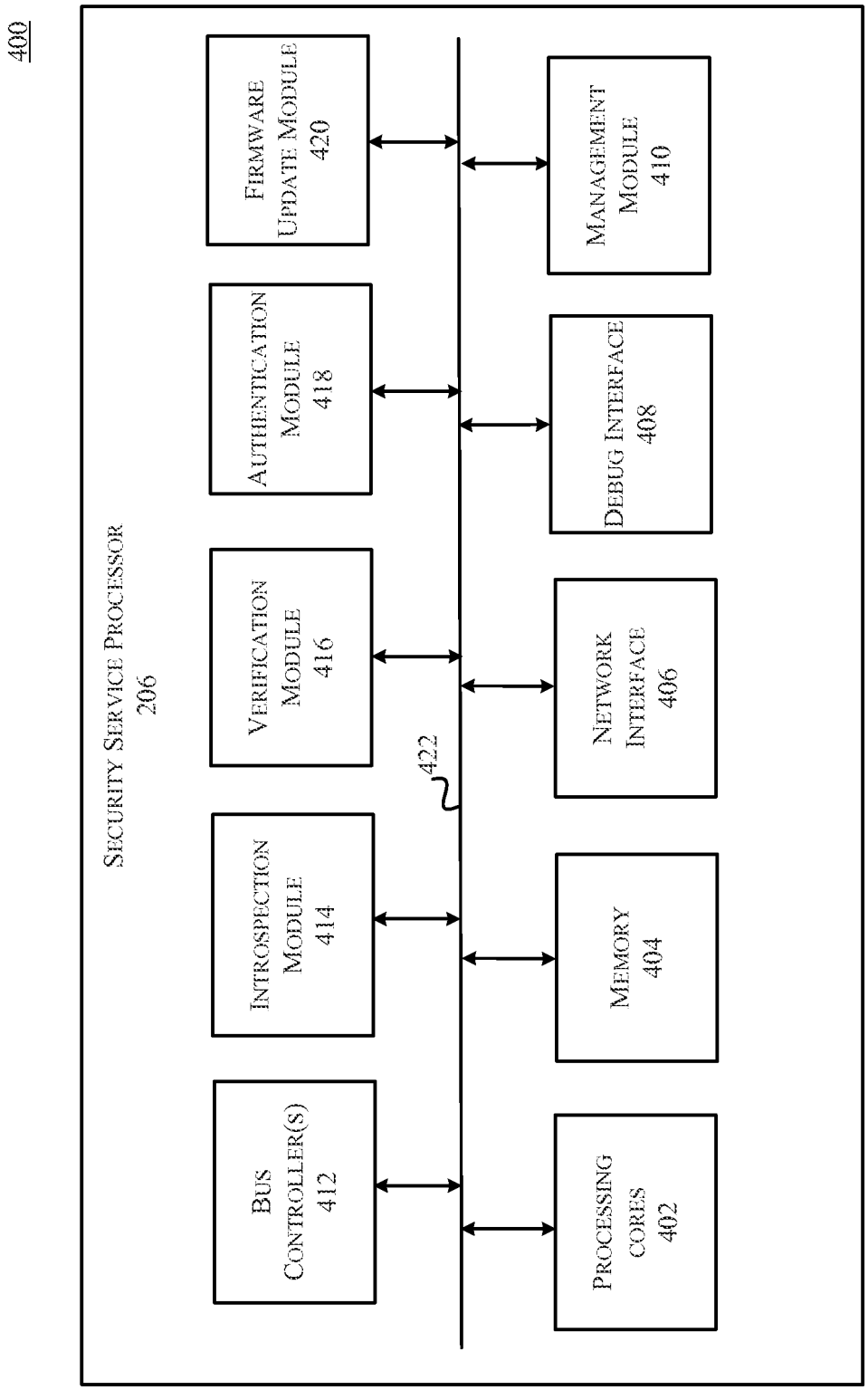
FIG. 4 illustrates components of a security service processor, according to one embodiment of the disclosed technology.
Figure 5B:
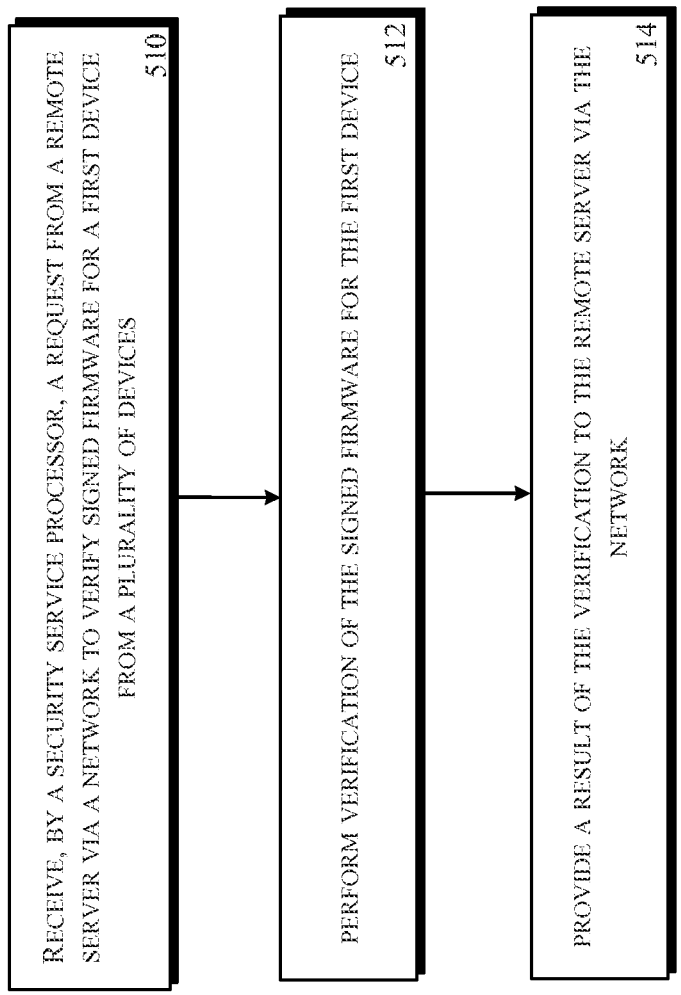
FIG. 5B illustrates a method for performing verification of the signed firmware for a device using the security service processor, in one embodiment of the disclosed technology.

FIG. 4 illustrates components of a security service processor, according to one embodiment of the disclosed technology.

The security service processor 206 may include one or more processing cores 402, a memory 404, a network interface 406, a debug interface 408, a management module 410, one or more bus controllers 412, an introspection module 414, a verification module 416, an authentication module 418 and a firmware update module 420. Different components of the security service processor 206 may be configured to communicate with one another using an interconnect 422. For example, the interconnect 422 may include busses, mesh, matrix, fabric or any suitable implementation to allow various components of the security service processor 206 to communicate with one another. It will be understood that the security service processor 206 may include more or less components than shown in FIG. 4. For example, in some implementations, the security service processor 206 may also include one or more memory controllers, I/O controllers, etc. Although, embodiments of the disclosed technologies are described and shown as including certain components, aspects of the disclosed technologies are not limited to including specific components as shown in FIGS. 3-4.

The processing cores 402 may be configured to execute a plurality of instructions on one or more processors of the processing cores 402. Some non-limiting examples of the processing cores 402 may include ARM's cortex A57, MIPS, AMD Phenom, Intel ATOM, etc. In some embodiments, the processing cores 402 may share certain resources, such as busses and Level 1 (L1) caches and/or Level 2 (L2) caches between each of the processing cores. The instructions may be stored on a computer-readable storage medium, for example, in the form of a computer program. The computer-readable storage medium may be non-transitory. In some instances, the computer readable medium may be part of the memory 404. The memory 404 may be internal or external to the security service processor 206. For example, the memory 404 may be a RAM, ROM, Electrically Erasable Programmable Read-Only Memory (EEPROM), flash memory or any suitable storage media.

In some embodiments, one or more cryptographic keys may be stored in the memory 404, e.g., the first cryptographic key, second cryptographic key, etc. For example, the one or more cryptographic keys may be used by the security service processor 206 to verify and authenticate the firmware updates for the devices 208. In various embodiments, the one or more cryptographic keys may be permanently stored in the memory 404 or can be stored in the memory 404 after retrieving from the remote server 102 via the first network interface 212.

The network interface 406 may include any suitable interface to enable the security service processor 206 to communicate with the remote server 102 via the networks 104. In one implementation, the network interface 406 may include a physical Ethernet port, e.g., a dedicated IP or MAC address may be assigned to the security service processor 206. In different embodiments, the security service processor 206 may communicate with the remote server 102 to perform remote management and security functionalities for the devices 208. The network interface 406 may be similar to the first network interface 212 as discussed with reference to FIGS. 2-3. In some embodiments, the networks 104 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc.

The debug interface 408 may include a hardware interface to allow access to internal components of the security service processor 206 for debugging, system testing, diagnosis, etc. For example, in some implementations, the debug interface 408 may include one or more pins or ports (e.g., a USB or serial port) that can be used for JTAG or another interface to allow invasive debug, non-invasive debug, etc. In some implementations, serial wire debug protocol can be used to provide debug and test functionalities using 2-pins debug port.

The management module 410 may be configured to manage different components of the security service processor 206. In some embodiments, the management module 410 may provide reset or power-cycling capabilities for various devices on the platform in the host computer 202 independent of the host processor 204A. For example, the management module 410 may receive a command from the remote server 102 via the network interface 406 to reset a device. If the device is on a separate power plane than the management module 410 may reset or power-cycle the device without any interaction with the host processor 204A. In some embodiments, the management module 410 may be configured to establish a trusted secure channel for communication between the remote server 102 and the security service processor 206. For example, TLS or any other suitable security protocol may be used for establishing the trusted secure channel via the network interface 406. The management module 410 may also be configured to establish a trusted secure channel (e.g., using a public key infrastructure) between a device and the security service processor 206 to perform firmware updates on the device. In one implementation, the management module 410 may include a configuration register to indicate whether the cryptographic keys used for authentication are permanently stored in the memory 404, provided by the remote server 102 or by a third entity. In some implementations, the management module 410 may configure and setup the DMA for the firmware update module 420 to perform hot patching on certain memory locations for a device.

The bus controllers 412 may include one or more bus controllers for various buses used for communication between the security service processor 206 and the devices 208, in various embodiments of the disclosed technologies. Referring back to FIG. 3, for serial buses, e.g., I$^2$C, SPI, etc., an SPI bus controller and/or an I$^2$C bus controller may be used to control cycles on the SPI bus or the I$^2$C bus, e.g., the bus 312 for the boot memory 304, the bus 318 for the low speed peripheral devices 310, the bus 314 for the storage memory 306, etc. Similarly, an LPC bus controller may be used to control cycles on the LPC bus, e.g., the bus 318 for the low speed peripheral devices 310. A PCIe controller may be used to control cycles on the PCIe bus 316 for the PCIe devices 308. In some implementations, an SMBus controller may be used to control cycles on the SMBus, e.g., the bus 320 for the optional BMC 302. In some implementations, the firmware update module 420 may request the appropriate bus controller to write certain memory locations for hot patching the firmware code for the corresponding device during runtime. In various embodiments, the security service processor 206 may utilize the appropriate bus controller to control or steal cycles on the corresponding bus to communicate with the specific device for introspection and verification before performing any firmware updates. For example, referring back to FIG. 3, in one implementation, the verification module 416 may request an SPI bus controller to read the firmware 304A for the boot memory 304 using the bus 312 for verifying the trustworthiness of the firmware 304A. After the firmware 304A has been authenticated by the authentication module 418, the firmware update module 420 may request the SPI bus controller to write the updated firmware received from the remote server 102 to the boot memory 304.

The introspection module 414 may be configured to perform introspection of various devices. For example, the security service processor 206 may receive a request to provide a status of one of the devices in the host computer 202. In some embodiments, the status of the device may include an output from one or more sensors, e.g., various sensors may be configured to monitor a state, temperature, humidity, power status, etc. of different devices on the platform.

The verification module 416 may be configured to perform verification of the firmware code for the device to determine trustworthiness of the device. For example, in some instances, firmware code for the device may have been tampered with to include malicious code. Some embodiments of the disclosed technologies can verify that the firmware executed by the device includes firmware signed by a trusted entity. For example, in one instance, the remote server 102 may send a request to verify the firmware 310A for a low speed peripheral device 310 (e.g., an EEPROM). The verification module 416 may request to read the firmware 310A from the low speed peripheral device 310 using the bus controller 412. The bus controller 412 may generate cycles on the bus 318 to read the firmware 310A. The verification module 416 may calculate a cryptographic hash of the firmware 310A and compare to a reference value. For example, any suitable cryptographic hash function such as SHA-1, MD5 may be used to generate the cryptographic hash. The reference value may be stored in the memory 404 or can be retrieved from the remote server 102 via the network interface 406. In some embodiments, the verification module 416 may utilize a cryptographic key to verify the firmware 310A. The cryptographic key may be stored in the memory 404 or can be retrieved from the remote server 102 via the network interface 406. The verification module 416 may provide a result of the verification to the remote server 102 via the network 104. In one embodiment, the verification module 416 can perform a periodic verification of the firmware executed by a device, e.g., weekly, monthly, etc. In another embodiment, the verification module 416 can be configured to perform verification of the existing firmware for the device before performing any firmware updates for the device.

The authentication module 418 may be configured to perform authentication of firmware updates received from the remote server 102 for various devices 208. For example, in one instance, the remote server 102 may send a request to update the firmware 310A for the low speed peripheral device 310 (e.g., an EEPROM). The authentication module 418 may receive the firmware update for the device from the remote server 102 via the network 104. The authentication module 418 may perform authentication of the received firmware using a first cryptographic key. For example, the first cryptographic key may be stored in the memory 404 or may be provided with a digital certificate by a trusted certificate authority. If the updated firmware is trustworthy based on the authentication result, the firmware update module 420 can perform the firmware update of the low speed peripheral device 310. In some embodiments, the authentication module 418 may authenticate the firmware update for a device after the existing firmware for the device has been verified by the verification module 416. In some embodiments, the authentication module 418 may perform additional security checks before the firmware update can be performed by the firmware update module 420. For example, the authentication module 418 may verify the version number for the firmware update against the version number of the existing firmware.

The firmware update module 420 may be configured to perform firmware updates for a device based on the authentication results from the authentication module 418. For example, after the authentication module 418 authenticates the firmware update, the firmware update module 420 may request the bus controller 412 to generate appropriate bus cycles to send the updated firmware to the device for installation. In some embodiments, the firmware update module 420 may request the bus controller 412 to generate appropriate bus cycles to send the updated firmware to the device for hot patching certain memory locations as configured by the management module 410.

In step 502, a security service processor receives a request from a remote server via a network to update firmware for a first device from a plurality of devices. For example, referring back to FIG. 2, the security service processor 206 may receive a request from the remote server 102 via the network 104 to update firmware for the first device from the devices 208. The security service processor 206 may be coupled to the devices 208 via different buses 218 on a platform in the host computer 202, e.g., a motherboard. The firmware may be part of the firmware stores 210 and may or may not reside on the first device. For example, as discussed with reference to FIG. 3, the first device may be the PCIe device 308 (e.g., a network interface card) coupled to the security service processor 206 via a first bus, the bus 316. Accordingly, the security service processor 206 may receive the request from the remote server 102 to update the firmware 308A. In accordance with the embodiments of the disclosed technologies, the PCIe device 308 may be configured to execute signed firmware, e.g., the firmware 308A. For example, the firmware 308A may have been signed using a cryptographic key at the time of production, at the board assembly or may have been re-flashed at another time.

In step 504, the security service processor receives the firmware update for the first device from the remote server via the network. Referring back to FIG. 4, the authentication module 418 may receive the updated firmware from the remote server 102 using the network interface 406, e.g., via the first network interface 212 over the network 104 using a secure communication channel. In some embodiments, the verification module 416 may verify trustworthiness of the signed firmware executed by the first device before the firmware update is received from the remote server 102. For example, if the firmware 308A for the PCIe device 308 is not trustworthy, the security service processor 206 may send an alert to the remote server 102 to take further corrective action in place of requesting for the firmware update.

In step 506, the security service processor authenticates the firmware update received from the remote server using a first cryptographic key. In accordance with embodiments of the disclosed technologies, the security service processor 206 can authenticate the firmware update received from the remote server 102 before providing the firmware update to the PCIe device 308 to determine the trustworthiness of the firmware update. Referring back to FIG. 4, the authentication module 414 may authenticate the firmware update received from the remote server 102 using the first cryptographic key that may be stored in the memory 404 or retrieved from the remote server 102 using a digital certificate. In some embodiments, the authentication module 414 may perform additional security checks to verify a version number for the firmware update. In some embodiments, if the firmware update cannot be authenticated, the security service processor 206 may send an alert to the remote server 102 using the network interface 406. For example, in some instances, the firmware update for the PCIe device 308 may include malicious code that may not include signed firmware and can be prevented from installing on the PCIe device 308 if the authentication of the firmware update fails.

In step 508, the security service processor provides the firmware update to the first device after authentication. Referring back to FIG. 4, if the authentication module 418 determines that the firmware update received from the remote server 102 is trustworthy; the firmware update module 420 may provide the firmware update for installing on the PCIe device 308 using a secure communication channel between the security service processor 206 and the PCIe device 308. For example, the PCIe controller may generate appropriate PCIe cycles on the bus 316 to send the firmware update to the PCIe device 308 for updating the firmware 308A.

In step 510, a security service processor receives a request from a remote server via a network to verify signed firmware for a first device from a plurality of devices. For example, referring back to FIG. 2, the security service processor 206 may receive a request from the remote server 102 via the network 104 to verify firmware for the first device from the devices 208. As discussed with reference to FIG. 3, the security service processor 206 may receive the request from the remote server 102 to verify the firmware 308A for the PCIe device 308. For example, the firmware 308A may have been signed using a cryptographic key at the time of production, at the board assembly or may have been re-flashed at another time.

In step 512, the security service processor performs verification of signed firmware for the first device. For example, referring back to FIG. 3, the security service processor 206 may verify that the firmware 308A for the PCIe device 308 is trustworthy. Some embodiments of the disclosed technologies can verify trustworthiness of the firmware 308A before performing any firmware updates to minimize the security risks and can flag any potential threats to the remote server 102 using the first network interface 212. Referring back to FIG. 4, a PCIe bus controller from the bus controller 412 may generate PCIe bus cycles on the bus 316 to read the firmware 308A for the PCIe device 308. The verification module 416 can perform verification of the firmware 308A by calculating a cryptographic hash of the firmware 308A and comparing with a reference value. The reference value may be stored in the memory 404 or can be retrieved from the remote server 102 via the network 104.

In step 514, the security service processor provides a result of the verification to the remote server. For example, the verification module 416 can provide the result of the verification to the remote server 102 via the network 104. In some instances, the firmware 308A could have been tampered with by inserting malicious code which can result in potential data loss for the customer. In some other instances, an untrustworthy hardware component comprising malicious firmware can be coupled to the bus 316 to inject malware. In some instances, lack of signed firmware for the untrustworthy hardware component may result in failed verification which can flag the security service processor 206 to not allow any firmware updates for the PCIe device 308.

In different embodiments of the disclosed technologies, a security service processor can provide introspection, verification and authentication of various firmware stores for different devices on a platform. The security service processor may be capable of generating cycles for different buses coupled to the various firmware stores. The security service processor can provide remote management and security functionalities for the different devices based on the communication with the remote server using a network interface. In some embodiments, the security service processor may be capable of performing hot patching for a hypervisor code or firmware code for a device without needing to shut down or restart the host computer. In addition, the security service processor can provide a hardware interface for remote debugging, testing, diagnosis, etc. Thus, various embodiments of the disclosed technologies can provide a centralized mechanism to securely update firmware for various devices on a platform without compromising the security of the host computer.

Figure 6:
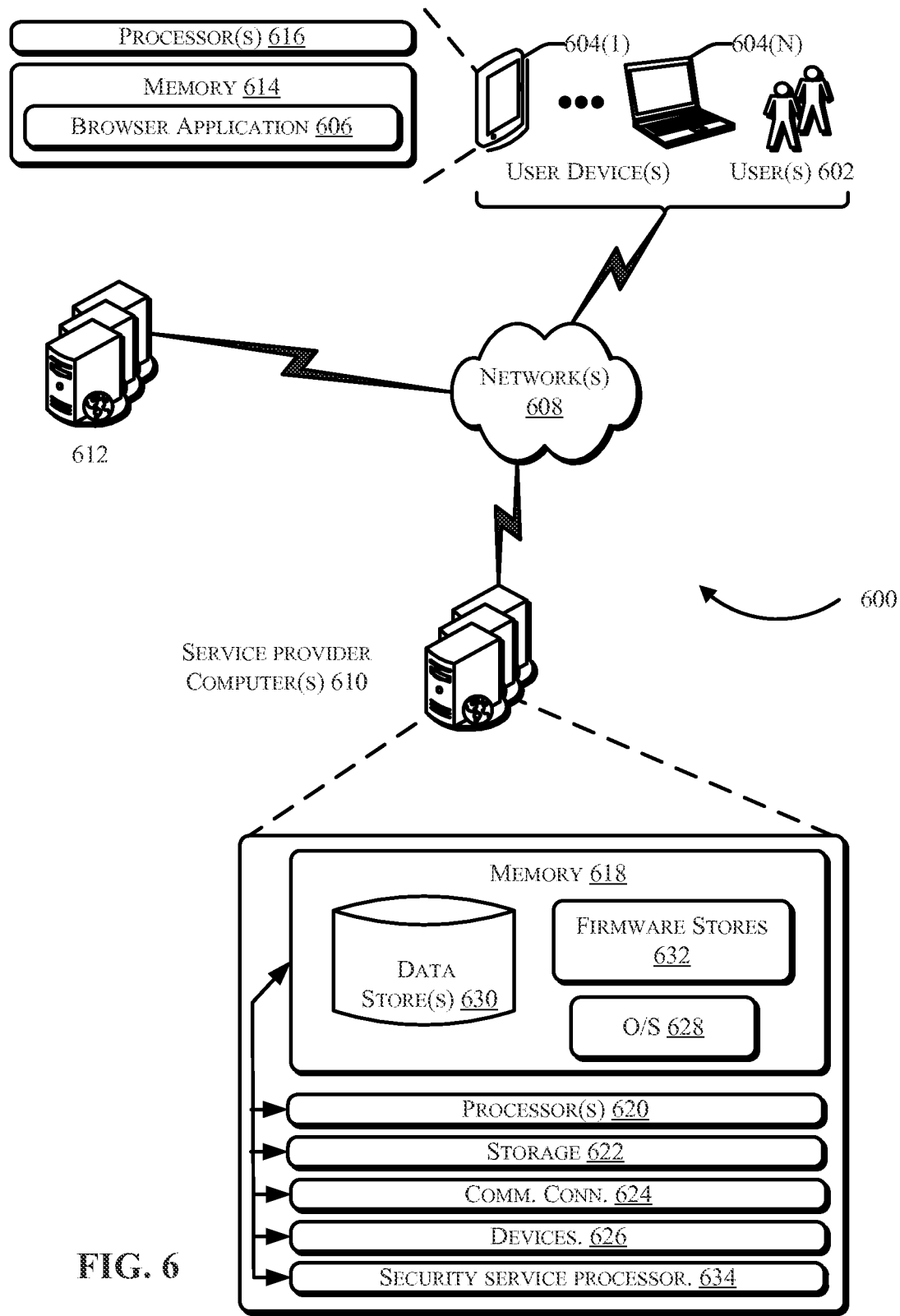
FIG. 6 illustrates an exemplary architecture for features and systems described herein that includes one or more service provider computers and/or a user device connected via one or more networks, according to at least one exemplary embodiment.

FIG. 6 illustrates an exemplary architecture for features and systems described herein that includes one or more service provider computers and/or a user device connected via one or more networks, according to at least one exemplary embodiment. The devices discussed in FIGS. 1-4, may use one or more components of the computing devices described in FIG. 6 or may represent one or more computing devices described in FIG. 6. In architecture 600, one or more users 602 may utilize user computing devices 604(1)-(N) (collectively, user devices 604) to access application 606 (e.g., a web browser or mobile device application), via one or more networks 608. In some aspects, application 606 may be hosted, managed and/or provided by a computing resources service or service provider. One or more service provider computers 610 may provide a native application which is configured to run on user devices 604 which user(s) 602 may interact with. Service provider computer(s) 610 may, in some examples, provide computing resources such as, but not limited to, client entities, low latency data storage, durable data storage, data access, management, virtualization, cloud-based software solutions, electronic content performance management, etc. Service provider computer(s) 610 may also be operable to provide web hosting, computer application development and/or implementation platforms, combinations of the foregoing or the like to user(s) 602. Service provider computer(s) 610, in some examples, may communicate with one or more third party computers 612.

In some examples, network(s) 608 may include any one or a combination of many different types of networks, such as cable networks, the Internet, wireless networks, cellular networks and other private and/or public networks. While the illustrated example represents user(s) 602 accessing application 606 over network(s) 608, the described techniques may equally apply in instances where user(s) 602 interact with service provider computer(s) 610 via user device(s) 604 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 606 may allow user(s) 602 to interact with service provider computer(s) 610 such as to access web content (e.g., web pages, music, video, etc.). Service provider computer(s) 610, perhaps arranged in a cluster of servers or as a server farm, may host application 606 and/or cloud-based software services. Other server architectures may also be used to host application 606. Application 606 may be capable of handling requests from many users 602 and serving, in response, various item web pages. Application 606 can provide any type of website that supports user interaction, including social networking sites, online retailers, informational sites, blog sites, search engine sites, news and entertainment sites and so forth. As discussed above, the described techniques can similarly be implemented outside of application 606, such as with other applications running on user device(s) 1404.

User device(s) 604 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 604 may be in communication with service provider computer(s) 610 via network(s) 608, or via other network connections. Additionally, user device(s) 604 may be part of the distributed system managed by, controlled by or otherwise part of service provider computer(s) 610 (e.g., a console device integrated with service provider computers 610).

In one illustrative configuration, user device(s) 604 may include at least one memory 614 and one or more processing units (or processor(s)) 616. Processor(s) 616 may be implemented as appropriate in hardware, computer-executable instructions, firmware, or combinations thereof. Computer-executable instruction or firmware implementations of processor(s) 616 may include computer-executable or machine-executable instructions written in any suitable programming language to perform the various functions described. User device(s) 604 may also include geo-location devices (e.g., a global positioning system (GPS) device or the like) for providing and/or recording geographic location information associated with user device(s) 604.

Memory 614 may store program instructions that are loadable and executable on processor(s) 616, as well as data generated during the execution of these programs. Depending on the configuration and type of user device(s) 604, memory 614 may be volatile (such as random access memory (RAM)) and/or non-volatile (such as read-only memory (ROM), flash memory, etc.). User device(s) 604 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 614 may include multiple different types of memory, such as static random access memory (SRAM), dynamic random access memory (DRAM), or ROM.

Turning to the contents of memory 614 in more detail, memory 614 may include an operating system and one or more application programs or services for implementing the features disclosed herein including at least a user provided input element or electronic service web page, such as via browser application 606 or dedicated applications (e.g., smart phone applications, tablet applications, etc.). Browser application 606 may be configured to receive, store and/or display a website or other interface for interacting with service provider computer(s) 610. Additionally, memory 614 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 604.

In some aspects, service provider computer(s) 610 may also be any type of computing devices such as, but not limited to, a mobile phone, a smart phone, a personal digital assistant (PDA), a laptop computer, a desktop computer, a server computer, a network switch, a thin-client device, a tablet PC, etc. Additionally, it should be noted that in some embodiments, service provider computer(s) 610 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 610 may be in communication with user device(s) 604 and/or other service providers via network(s) 608, or via other network connections. Service provider computer(s) 610 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 610 may include at least one memory 618 and one or more processing units (or processor(s)) 620. Processor(s) 620 may be implemented as appropriate in hardware, computer-executable instructions, firmware or combinations thereof. Computer-executable instruction or firmware implementations of processor(s) 620 may include computer-executable or machine-executable instructions written in any suitable programming language to perform the various functions described.

In some instances, hardware processor(s) 620 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 618 may store program instructions that are loadable and executable on processor(s) 620, as well as data generated during the execution of these programs. Depending on the configuration and type of service provider computer(s) 610, memory 618 may be volatile (such as RAM) and/or non-volatile (such as ROM, flash memory, etc.). Service provider computer(s) 610 or servers may also include additional storage 622, which may include removable storage and/or non-removable storage. The additional storage 622 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 618 may include multiple different types of memory, such as SRAM, DRAM, or ROM.

Memory 618, the additional storage 622, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 618 and the additional storage 622 are all examples of computer storage media. Additional types of computer storage media that may be present in service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 610. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 610 may also contain communications connection(s) 624 that allow service provider computer(s) 610 to communicate with a stored database, another computing device or server, user terminals and/or other devices on network(s) 608. Service provider computer(s) 610 may also include device(s) 626, such as I/O devices, e.g., a keyboard, a mouse, a pen, a voice input device, a touch input device, a display, speakers, a printer, etc., and peripheral devices. For example, the peripheral devices may include PCI devices, low speed peripheral devices, low bandwidth devices, etc. In some embodiments, some of the devices 626 may include signed firmware.

Memory 618 may include an operating system 628, one or more data stores 630 and/or one or more application programs or services for implementing the features disclosed herein. In some implementations, the memory 618 may include firmware stores 632. The firmware stores 632 may be similar to the firmware stores 210 as described with reference to FIG. 2. For example, the firmware stores 632 may include firmware for various devices, e.g., the devices 626, storage 622. According to some embodiments, a security service processor 634 may be configured to verify and authenticate the signed firmware for the devices 626 and any firmware updates for the devices 626. For example, the security service processor 634 may be similar to the security service processor 206, as discussed with reference to FIGS. 2-4. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

Figure 7:
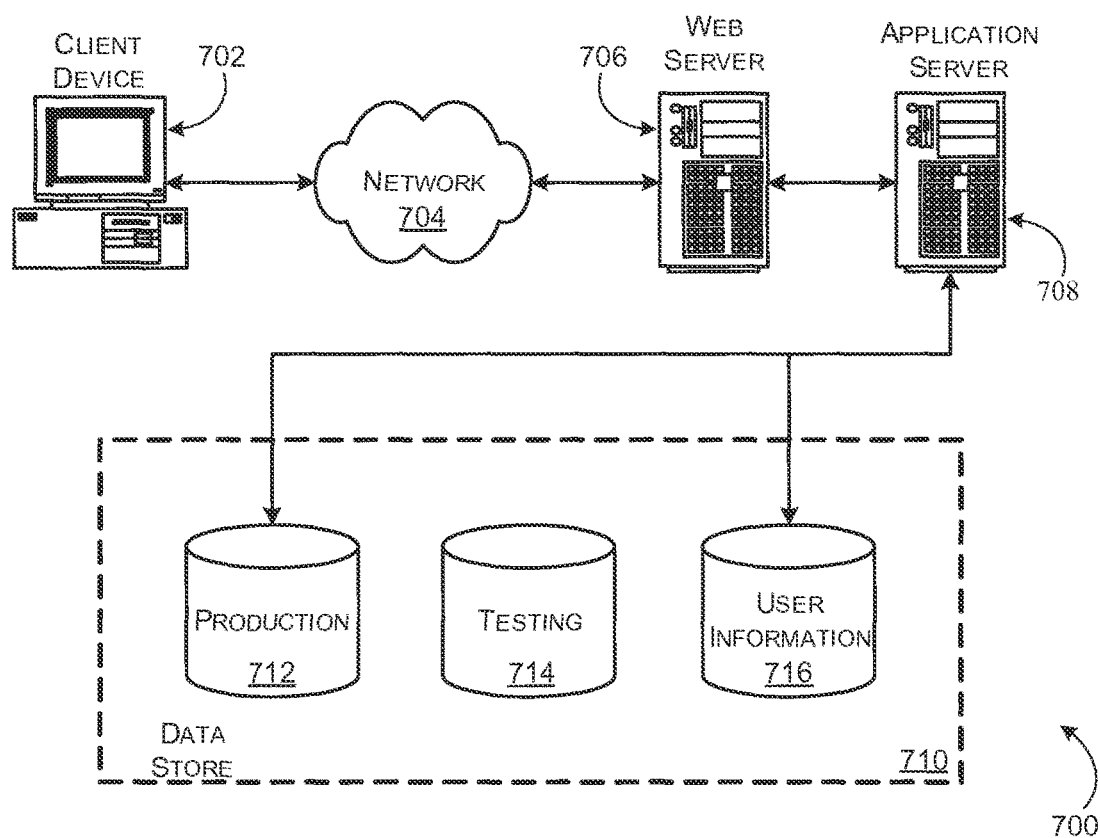
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 77. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 77 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 77. The data store 77 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A security service hardware processor comprising:
a processor core, wherein the processor core is configured to execute a plurality of computer-executable instructions;
a host interface configured to communicate with a host device, the host device comprising a host processor and a signed host firmware, wherein the host processor is configured to execute the signed host firmware;
a plurality of bus controllers, wherein each bus controller from the plurality of bus controllers is configured to communicate with a respective device from a plurality of devices using a respective bus from a plurality of buses, wherein each of the devices is configured to execute a respective signed firmware and is communicatively coupled to the host device, and wherein each of the devices is a peripheral device to the host device;
a network interface configured to communicate with a remote server via a network, wherein the security service hardware processor is configured to receive a request from the remote server via the network interface to perform remote management for each of the devices from the plurality of devices and receive another request from the remote server via the network interface to perform remote management of the host device;
a verification module configured to verify the respective signed firmware for each of the devices and the signed host firmware for the host device;
an authentication module configured to authenticate firmware updates received from the remote server for each of the devices and host firmware update received from the remote server for the host device; and
a firmware update module configured to provide the firmware updates to a respective device using a respective bus after the firmware update for the respective device is authenticated and configured to provide the host firmware update to the host device using the host interface after the host firmware update is authenticated,
wherein the security service hardware processor, the host device and the plurality of devices are part of a host computer.

2. The security service hardware processor of claim 1, wherein the plurality of buses include an I²C (Inter-Integrated Circuit) bus, an SPI (Serial Peripheral Interface) bus, a SMBus (System Management Bus), a PCIe (Peripheral Components Interconnect Express) bus or an LPC (Low Pin Count) bus.

3. The security service hardware processor of claim 1, wherein the plurality of devices include a boot memory, a PCIe device, a low speed peripheral device or a storage memory.

4. A security service hardware processor comprising:
a network interface configured to communicate with a remote server via a network;
a host interface configured to communicate with a host device, the host device comprising a host processor and a signed host firmware, wherein the host processor is
configured to execute the signed host firmware; and
a first bus controller configured to communicate with a
first device using a first bus, wherein the first device is
configured to execute a signed firmware and is communicatively coupled to the host device, and wherein
the first device is a peripheral device to the host device,
wherein the security service hardware processor is configured to:
receive a first request from the remote server via the
network to update the signed firmware for the first
device;
receive a firmware update for the first device from the
remote server via the network;
authenticate the first firmware update received from the
remote server using a first cryptographic key;
provide the first firmware update to the first device
using the first bus after the first firmware update is
authenticated;
receive a second request from the remote server via the
network to update the signed host firmware;
receive a signed host firmware update for the host
device from the remote server via the network;
authenticate the signed host firmware update received
from the remote server using a second cryptographic
key; and
provide the signed host firmware update to the host
device using the host interface after the signed host
firmware update is authenticated,
wherein the service hardware processor, the host device
and the first device are part of a host computer.

5. The security service hardware processor of claim 4, wherein the signed firmware is part of the first device.

6. The security service hardware processor of claim 4, wherein the signed firmware is in a firmware store on the host computer.

7. The security service hardware processor of claim 4, wherein the security service hardware processor authenticates at least one of the first firmware update or the signed host firmware update received from the remote server independent of the host device.

8. The security service hardware processor of claim 7, wherein the security service hardware processor is further configured to reset the first device without any interaction with the host device.

9. The security service hardware processor of claim 4, wherein the security service hardware processor is also configured to:
receive a request from the remote server via the network
to verify the signed firmware for the first device; and
perform verification of the signed firmware by calculating
a cryptographic hash of the signed firmware and comparing to a reference value.

10. The security service hardware processor of claim 4, wherein the security service hardware processor is also configured to perform introspection of the first device to provide a status of the first device to the remote server via the network interface.

11. The security service hardware processor of claim 4, further comprising a hardware interface for debugging.

12. The security service hardware processor of claim 11, wherein the hardware interface includes an interface to a serial port.

13. The security service hardware processor of claim 4, wherein the first cryptographic key is provided by the remote server.

14. The security service hardware processor of claim 4, wherein the first cryptographic key resides on the security service hardware processor.

15. The security service hardware processor of claim 4, wherein the signed host firmware comprises instructions for a hypervisor that when executed by the host processor manages a virtual machine.

16. The security service hardware processor of claim 4, wherein the security service hardware processor is on a different power plane than the host processor, and wherein the security service hardware processor is further configured to authenticate the first firmware update for the first device, while the host processor is in a non-functional state.

17. A security service hardware processor comprising:
a network interface configured to communicate with a
remote server via a network;
a host interface configured to communicate with a host
device, the host device comprising a host processor and
a signed host firmware, wherein the host processor is
configured to execute the signed host firmware; and
a bus controller configured to communicate with a device
using a bus, wherein the device is configured to execute
a signed firmware and is communicatively coupled to
the host device, and wherein the device is a peripheral
device to the host device,
wherein the security service hardware processor is configured to:
receive a first request from the remote server via the
network to verify the signed firmware for the device;
perform a first verification of the signed firmware for
the device; and
provide a first result of the first verification to the
remote server via the network;
receive a second request from the remote server via the
network to verify the signed host firmware;
perform a second verification of the signed host firmware for the host device; and
provide a second result of the second verification to the
remote server via the network,
wherein the security service hardware processor, the host
device and the device are part of a host computer.

18. The security service hardware processor of claim 17, wherein performing the first verification includes calculating a cryptographic hash of the signed firmware and comparing to a reference value.

19. The security service hardware processor of claim 18, wherein the reference value is provided by the remote server via the network.

* * * * *